May 2, 1967 R. A. JEFFERYS 3,317,343
ACTIVATED COATING OF COLUMBIUM METAL
Filed Feb. 1, 1963 9 Sheets-Sheet 1

INVENTOR.
RICHARD A. JEFFERYS
BY
ATTORNEYS

May 2, 1967 R. A. JEFFERYS 3,317,343
ACTIVATED COATING OF COLUMBIUM METAL
Filed Feb. 1, 1963 9 Sheets-Sheet 7

Fig. 10

INVENTOR.
RICHARD A. JEFFERYS
BY
ATTORNEYS

United States Patent Office 3,317,343
Patented May 2, 1967

3,317,343
ACTIVATED COATING OF COLUMBIUM METAL
Richard A. Jefferys, Euclid, Ohio, assignor to the United States of America as represented by the Secretary of the Air Force
Filed Feb. 1, 1963, Ser. No. 256,223
6 Claims. (Cl. 117—107.2)

This invention concerns the protective coating of a refractory metal and its alloys against oxidation in both the article and the method.

The engineering requirements for materials of construction for hypersonic flight and for re-entry into the atmospheric envelope that surrounds the earth, challenge man's knowledge and ingenuity directed toward the supplying of materials that are characterized by sustained great strengths at elevated temperatures and with retarded oxidation rates.

The refractory metal that is contemplated hereby is represented illustratively by niobium Nb, which is also known as columbium Cb. Niobium or columbium alloys particularly are vitreous under use up to the temperature of 2,600° F. which corresponds to 1,427° C.

The application of protective coatings to metal surfaces commonly are from the fluid phases of vapor, solutions and molten states and by cementation processes. Precision in the making of alloy compositions is best attained within an evacuated container; within an atmosphere that is chemically inert to the elements in the alloy; beneath a non-reactive, protective fluid flux; or the like.

The known methods for coating metals, and their alloys, commonly fall into three categories: (1) hot dipped or slurry dipped coatings; (2) flame sprayed coatings; and (3) vapor deposition-pack cementation coatings. Coating evaluation tests commonly have consisted of static oxidation with or without thermal cycling. The base metal and its coating are considered to be a system.

The use of activator additions of potassium fluoride, for example, to the vacuum vapor-pack deposition processes that are described herein for the protective coating of refractory metals such as columbium, for example and their alloys, is a primary object of the present invention. The vacuum vapor pack deposition process protectively coats refractory metal surfaces from high temperature oxidation by vapor phase partial pressures applied to the metal surfaces at elevated temperatures for diffusion thereinto and for the retention thereby. Case hardening steel by carbon diffusion into the steel and the retention thereby as the very hard $Fe_3C$ is an early ferrite metal analogy. Another analogy but without diffusion down into the material is the cladding of a metal. Vapor phase partial pressures require an initial evacuation of the vacuum furnace before the desired proportion of partial pressures are built up by the temperature increase to change the solids, chromium, titanium and silicon, into their vapor phases before they have the energy to diffuse into the niobium or columbium or other refractory metal surfaces as a protective layer arresting the oxidation at elevated temperatures up to 2600° F. for columbium.

Illustrative niobium or columbium alloys of high strength and of good oxidation resistance are the compositions by weight of: Cb–8Ti; Cb–7Ti–28W (or the alloy Cb–7); Cb–10Ti–20W–3V (or the alloy Cb–16); Cb—10Ti—10Mo (or the alloy D–31); and Cb–10Ti–6Mo–20W (or the alloy D–41). Columbium alloys of high strength and of fair oxidation resistance are of the composition: Cb–15W–5Mo–1Zr (or the alloy F–48);

Cb–15W–5Mo–5Ti–1Zr (or the alloy F–50); Cb–7Ti–28W (or the alloy Cb–7); and Cb–5Zr–10W (or the alloy Cb–74). Columbium alloys of lesser strength and of low oxidation resistance are: Cb–0.75Zr (or the alloy D–16); Cb–33Ta–0.75Zr (or the alloy FS–82); and Cb–8Ti–0.75Zr (or the alloy Cb–65).

The object of the present invention is the provision of materially improved protective coatings for niobium or columbium refractory metals and their alloys, when exposed to air under temperature conditions in the order of 2,000° F. to 2,600° F. for considerable lengths of time, and for shorter periods of time at 2,800° F., without suffering destructive surface oxidation, internal penetration of oxygen or related contamination and loss of useful structural metal.

Other objects of this invention are the provision of an optimum tensile strength alloy at temperatures in the order of 2,000° F. as having the composition Cb–15W–5Mo–1Zr high oxidation resistance at 2,000° F. and above for alloys having the compositions Cb–10Ti–6Mo–20W; and Cb–7Ti–28W; in a moderate to high strength category for the alloy having the composition Cb–15W–5Mo–5Ti–1Zr etc. The alloy having the composition Cb–10Ti–20W–3V is highly resistant to oxidation. The alloy having the composition Cb–5Zr–10W has good fabricability. The representative D–31 alloy of the composition Cb–10Ti–10Mo has a high combination of mechanical strength and resistance to oxidation. Pure columbium and its alloys that have relatively low mechanical strength are characterized by good cold fabricability but they do not resist oxidation as effectively as do some of the other alloys.

The protective lives of Cr–Ti–Si coatings that are deposited on niobium or columbium alloys from activated coating packs that are activated illustratively with KF have far surpassed the lives that are obtained on coatings formed under non-activated conditions.

Comparative oxidation protective life determinations for columbium and for the alloy D–31 substrates at 2,500° F. in air are demonstrated in the following chart:

| Coatings | Coatings Conditions | Life in Hours at 2,500° F.[1] | |
|---|---|---|---|
| | | Cb | Cb-10Ti-10Mo (D-31) |
| Cr-Ti | 16–24 hrs., 2,350° F | <1 | 1–2 |
| Cr-Ti-Si (non-activated) | (Cr-Ti), 16–24 hrs., 2,350° F<br>(Si), 16 hrs., 2,150° F | 4–8 | 10–20 |
| Ti+Cr-Ti-Si | (Ti), 16 hrs., 2,200° F<br>(Cr-Ti), 16–24 hrs., 2,350° F<br>(Si), 16 hrs., 2,150° F | 18–24 | 30–50 |
| Cr-Ti-Si (activated) | (Cr-Ti), 8 hrs., 2,300° F<br>(Si), 5–8 hrs., 2,100° F | 30–50 | 70–85 |

[1] Test specimens were cycled to room temperature from 2,500° F. eight times in every 24-hour period.

It will be noted in the above chart data that considerable improvement in protective life is obtained by alloying the Cr–Ti overlay coating with silicon and in prealloying the base metal with titanium, prior to coating it with Cr–Ti. The presence of titanium in significant amounts increases the chromium concentration in the diffusion zone and, together with a stable Cb–Cr$_2$ layer, provides a barrier to oxygen penetration to the base metal.

The superior performance of the KF activated and the pre-treated Ci–Ti–Si coatings on columbium substrates, that are contemplated hereby, are believed to be the result of two factors. One factor is the formation of a continuous zone of Cb–Cr$_2$ at the coating-diffusion zone interface, such that the structure inhibits the diffusion of oxygen inwardly and of columbium outwardly of the system. The second factor is believed to be the formation of a highly alloyed chromium-silicon region beneath the outer silicon layer, which apparently heals the thermal and the mechanical cracks that are produced in the coating from thermal cycling and which supplies silicon to the outer SiO$_2$ layer on the surface. This observation is theoretical and is not controlling on this invention.

Figure 1:
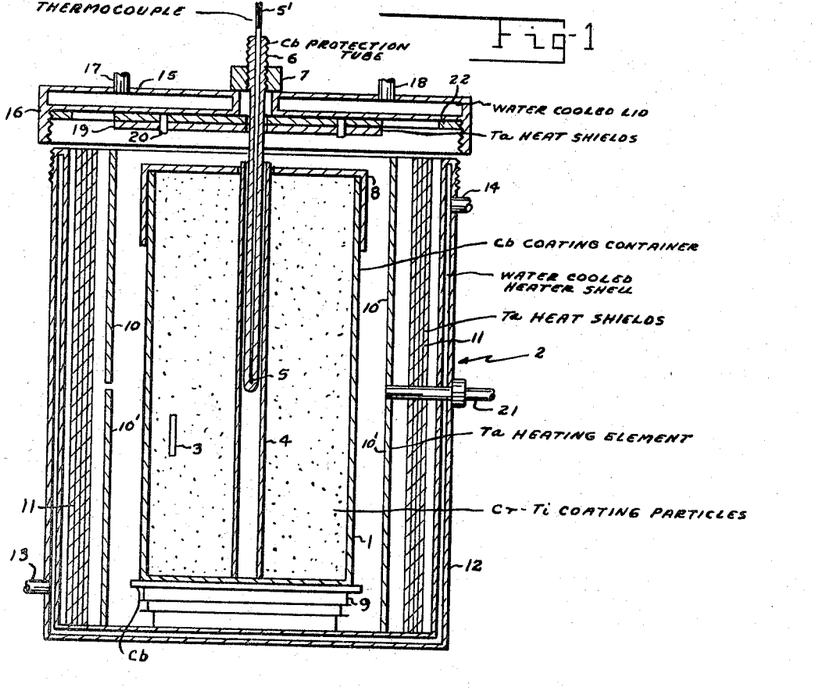
FIG. 1 is an axial sectional view of an improved cold wall vacuum furnace that contains the cementation chamber within which niobium or columbium pieces have oxidation preventing coatings applied to the surfaces thereof as part of the present invention.

The refractory metal coating pack container in the resistance furnace heating chamber, is represented in axial section in FIG. 1 of the accompanying drawings. The apparatus comprises the charge and coating pack containing can 1, within the cold wall vacuum furnace chamber 2. The interior of the vacuum furnace chamber 2 is maintained at a pressure of 0.1 micron or below throughout the coating operation.

The article 3 of columbium, or the like, that is to be coated, is positioned within the can 1 by being embedded among particles of chromium and titanium and the chosen activator such, preferably, as potassium fluoride. Illustrative proportions by weight are half-and-half chromium and titanium and low-level quantities of up to about one percent by weight of potassium fluoride. The can 1 is charged with the coating pack and the articles to be coated, and with the thermocouple receiving tube 4 in place axially of the can 1. With the charge filling the can 1, the centrally apertured can cover 8 is applied to the top of the can 1 and the can is replaced on its supporting base 9. The thermocouple mounting tube 6 is inserted into the thermocouple receiving tube 4 and is adjusted to place the thermocouple hot junction 5 at about the center of mass, by the rotation of the nut 7. The nut 7 makes sealing engagement with the lid shell 15. The pair of thermocouple lead wires 5' conduct the output from the thermocouple hot junction 5 to a temperature indicating instrument, not shown, outside of the assembly.

Suitable heating elements 10, 10', etc., are disposed outside of the can 1 and are powered from outside the assembly to maintain a working temperature of from 1800° F. to 2450° F., within the furnace. A desired plurality of body heat shields 11 are disposed radially outwardly of the heating elements 10 and 10' and inwardly of the water-cooled body shell 12.

The water-cooled furnace body shell 12 comprises both the body and the bottom of the furnace heating chamber. Cooling water passes between the body shell water connections 13 and 14 and provides a continuous flow of water through the body shell 12 during the operation of the furnace.

The upper end of the water-cooled heater body shell 12 is closed by the water-cooled lid shell 15. The lid shell 15 is secured to the body shell 12 in a suitable manner, as by the threading thereon of the ring collar 16 in sealing relation therewith, as with the gasket 22 therebetween or the like. Water is passed continuously through the lid shell 15, as between the water connections 17 and 18. Lid shell heat shields 19 are attached by the securing straps 20 to the lower or the inner surface of the furnace lid shell 15. The interior of the assembled and charged furnace during the vacuum vapor deposition process is evacuated through the chamber vacuum port 21, to the pressure of one-tenth of a micron of mercury or below. An atmosphere of metallic vapors is generated within the pack by the vapor pressure of the elements present within the furnace.

Figure 2:
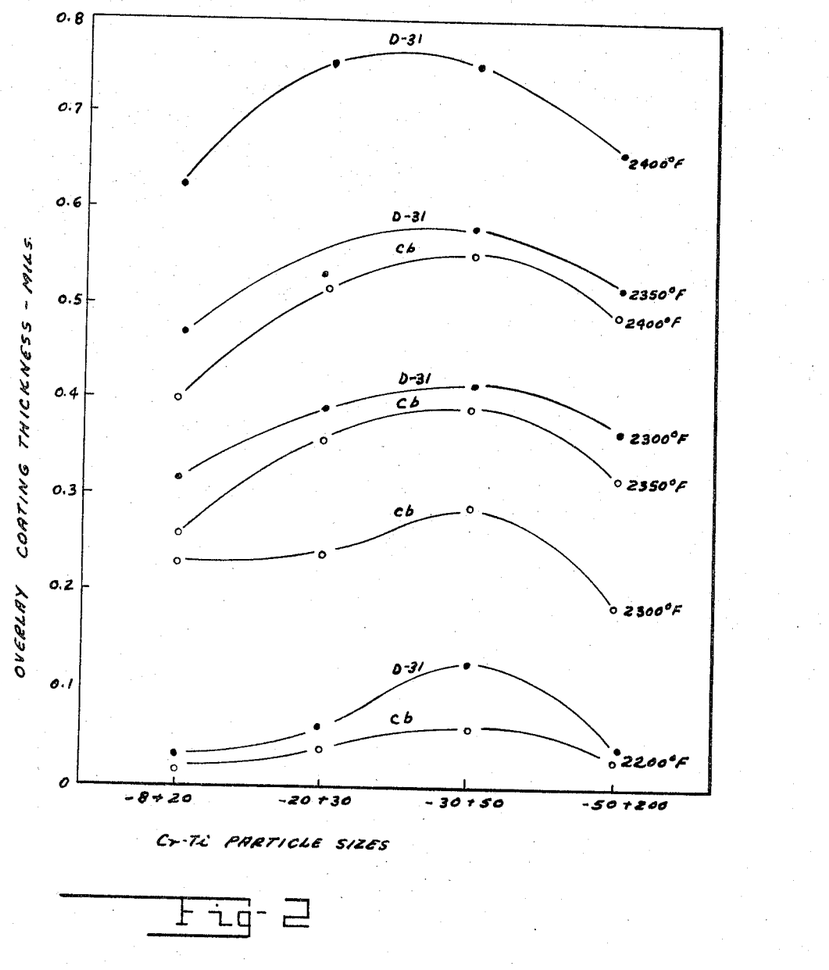
FIG. 2 is a series of curves of U.S. standard sieve chromium-titanium particle sizes in which the columbium pieces in FIG. 1 are embedded as a coating pack, plotted against the resulting overlay thicknesses at progressive temperatures for columbium and for D–31 alloy base metals.

In FIG. 2 of the accompanying drawings are shown curves that indicate the range of the particle sizes in terms of the U.S. standard sieve, of the chromium and titanium charge in the can 1. In FIG. 2, the particle sizes are shown associated with the thickness in mils of the overlay coatings on the columbium article 3 in the can 1 over the temperature range of from 2,200° F. to 2,400° F. maintained for about 16 hours, on columbium and on the D–31 alloy of the composition Cb–10Ti–10Mo.

At the lower temperatures, the chart in FIG. 2 indicates that the particle size appears to be more critical than at the higher temperatures, with the maximum coating thickness derived from particles of the fineness of −30 to +50 mesh. As the temperature increases to 2,400° F., the maximum coating thickness is attained with particles of the ranges of −20 to +30 and −30 to +50 mesh. The packing and the partial sintering of the finer granules appear to reduce the effective surface area of the granules and reduce the thickness of the coatings produced.

It will be noted that under like conditions the overlay coating thickness on the D-31 alloy exceeds the overlay coating thickness on unalloyed columbium. As the temperature of the process is increased and the particle size of the coating material is decreased, the sintering of the coating particles to the material being coated is increased or is more pronounced. At 2,400° F. and for particle sizes within the range of from −20 to +30 mesh, the particle range sintering is not serious enough to be detrimental to the coated surface. Eutectic melting of the particles appears to establish a limitation on the process at about 2,450° F.

Figure 3:
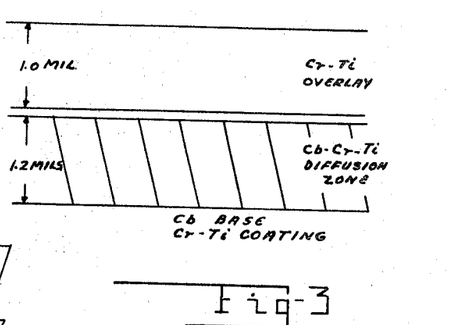
FIG. 3 is a schematic sketch in section representing a chromium-titanium coating applied to the columbium base metal substrate, using the equipment shown in FIG. 1.
Figure 4:
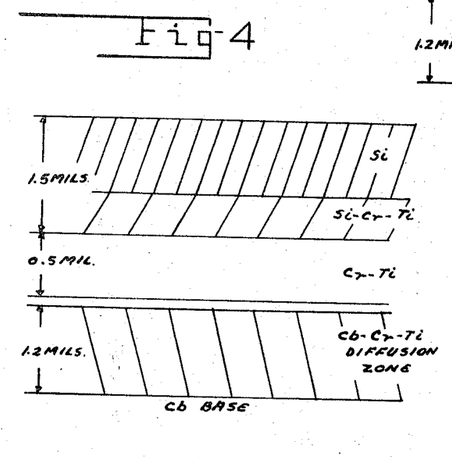
FIG. 4 is a schematic sketch in section representing alloying the chromium-titanium layer in FIG. 3 with silicon, using the apparatus of FIG. 1.
Figure 7:
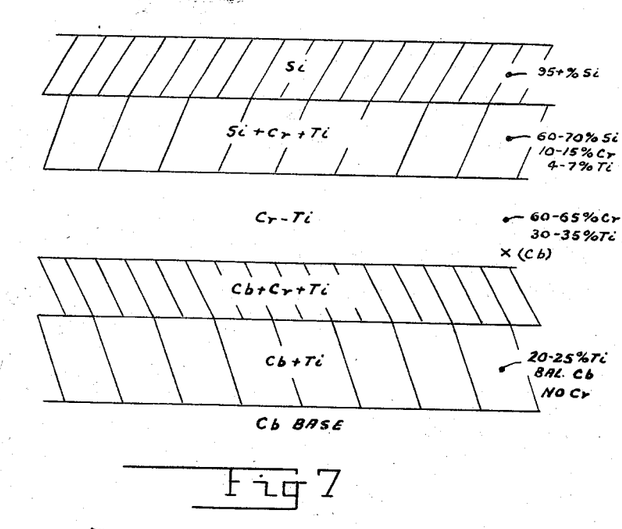
FIG. 7 is a sectional view with the composition analysis values of the successive layers on the base metal applied by the use of the apparatus in FIG. 1.

A highly protective surface alloy coating on columbium or on the alloy D-31, is of chromium, titanium and silicon composition. On a base metal of columbium, as illustrated in FIGS. 3, 4 and 7 of the drawings, the chromium-titanium overlay coating and diffusion zone are formed first and then, in FIGS. 4 and 7, are alloyed with silicon. The addition to the chromium-titanium alloy coating pack of a low-level quantity of a preferred activator results in substantially higher deposition rates of the metallic elements from the vapor phase and a corresponding increase in the rate of diffusion zone advancement in the columbium substrate. The activator potassium fluoride has been determined to be adequately effective.

In FIG. 3 of the accompanying drawings is shown a schematic profile of a product made in the apparatus shown in FIG. 1 on a columbium base metal, using a coating pack of equal parts of Cr–Ti particles. The chromium-titanium coating is applied to the columbium base metal in 16 hours at a temperature of 2,350° F. as a columbium-chromium-titanium diffusion zone between the columbium base metal and the chromium-titanium overlay.

In FIG. 4 of the accompanying drawings is shown another product using the equipment shown in FIG. 1. The coating in FIG. 4 is applied to a columbium base metal article embedded in Cr–Ti–Si particles in equal parts by weight, that has been heated in the can 1 in FIG. 1 for 16 hours at a temperature of 2,150° F. The coating applied to the columbium base metal consists sequentially outwardly of a columbium-chromium-titanium diffusion zone, a layer of chromium-titanium, a layer of silicon-chromium-titanium and a surface layer of silicon. The chromium-titanium alloy is first deposited and is diffused with the columbium, and then the chromium-titanium layer is alloyed progressively with silicon. Because of melting point considerations, chromium, titanium and silicon are not deposited simultaneously.

Figure 5:
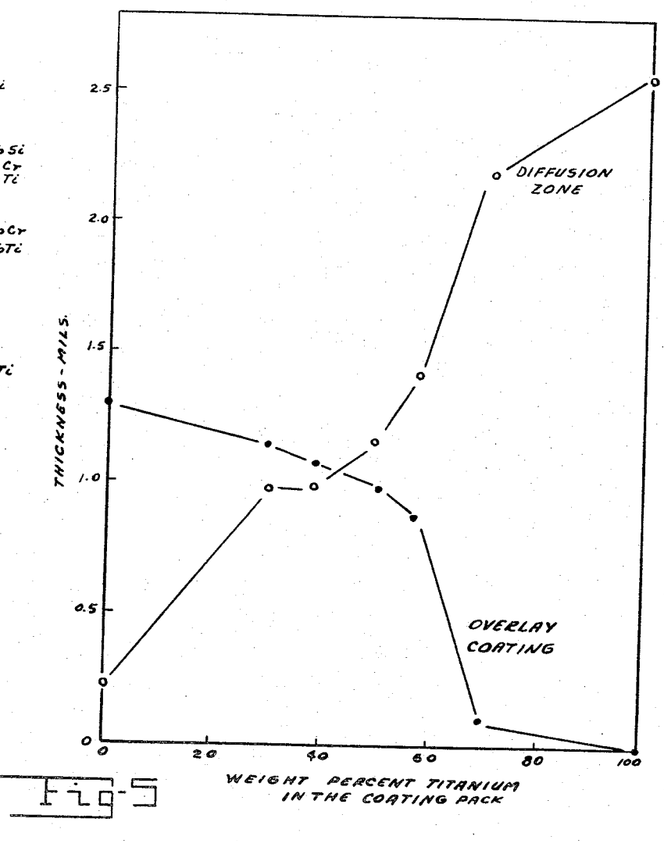
FIG. 5 is a pair of curves presenting the effect of the titanium content of the coating pack, on the thickness of the overlay coating and of the diffusion zone.

FIG. 5 is a pair of curves showing the effect of the titanium content of the pack alloy on the thickness of the overlay coating and diffusion zone, using the equipment in FIG. 1.

In FIG. 5 of the accompanying drawings, the rate of diffusion of the coating elements is greater in the D-31 alloy than it is in the unalloyed columbium. In coating both the D-31 alloy and the unalloyed columbium in the chromium-titanium charge or pack in the can 1, as the titanium content of the pack in the can 1 is increased above 50 weight percent, the thickness of the overlay coating decreases as the depth of the diffusion zone increases. The protective life of the chromium-titanium-silicon coating appears to be maximum where the chromium-titanium layer is most thick. The chromium-titanium-silicon coating of thicknesses within the range of from 1.4 to 2 mils provides a satisfactory oxygen diffusion barrier. The pack composition is by weight within the range of from 30 to 70 percent chromium with the difference percentage in titanium with adequate low-level quantities in the order of one percent of the preferred activator, such as potassium fluoride.

Figure 6:
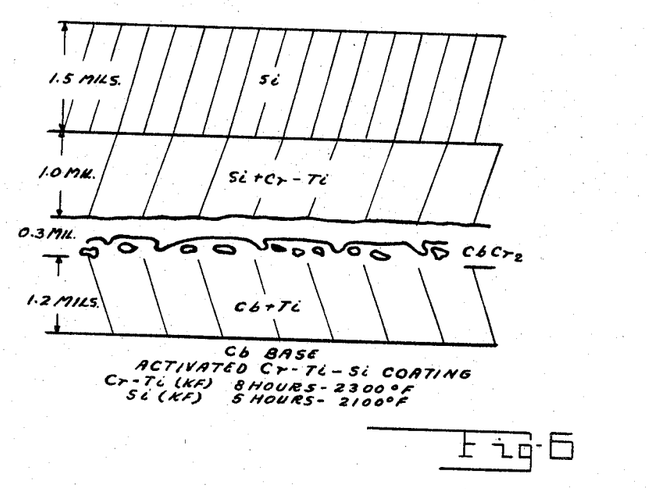
FIG. 6 is a schematic drawing of the chromium-titanium-silicon coating activated with up to one-percent by weight of potassium iodide in the coating pack, using the equipment in FIG. 1.

FIG. 6 is a schematic drawing of the activated chromium-titanium-silicon coating as it forms. The addition of activators demonstrates that the silicon alloy layer thickness is a function of the coating time and under activated conditions, all the chromium-titanium coating layer is alloyed with silicon. The addition of the activator to the silicon pack in the can 1 increases the deposition rate by a factor of from 3 to 5 times the deposition rate for the non-activated process.

FIG. 7 is a schematic profile view in section of the Cr–Ti–Si coating on columbium base metal, showing the chemical analysis of parts of the coating. The chemical compositions are rough approximations which indicate a pattern. The values are based on line intensity measurements and are not free from errors. Silicon line intensities are compared with line intensities of pure silicon powder and mixtures of powders containing chromium and titanium. The standards for chromium and titanium are the pre-alloyed chromium-titanium compositions used in the coating pack compositions studied.

In FIG. 7 it will be noted first that no chromium is found in the inner region of the diffusion zone visible in the optical microscope. This supports the observations that were made in the electron microscope that at the same temperature chromium diffuses at a slower rate in columbium than titanium does; and that columbium is detected in the chromium-titanium overlay coating region out from the interface, which indicates that columbium does diffuse outwardly from the columbium base metal.

Figure 8:
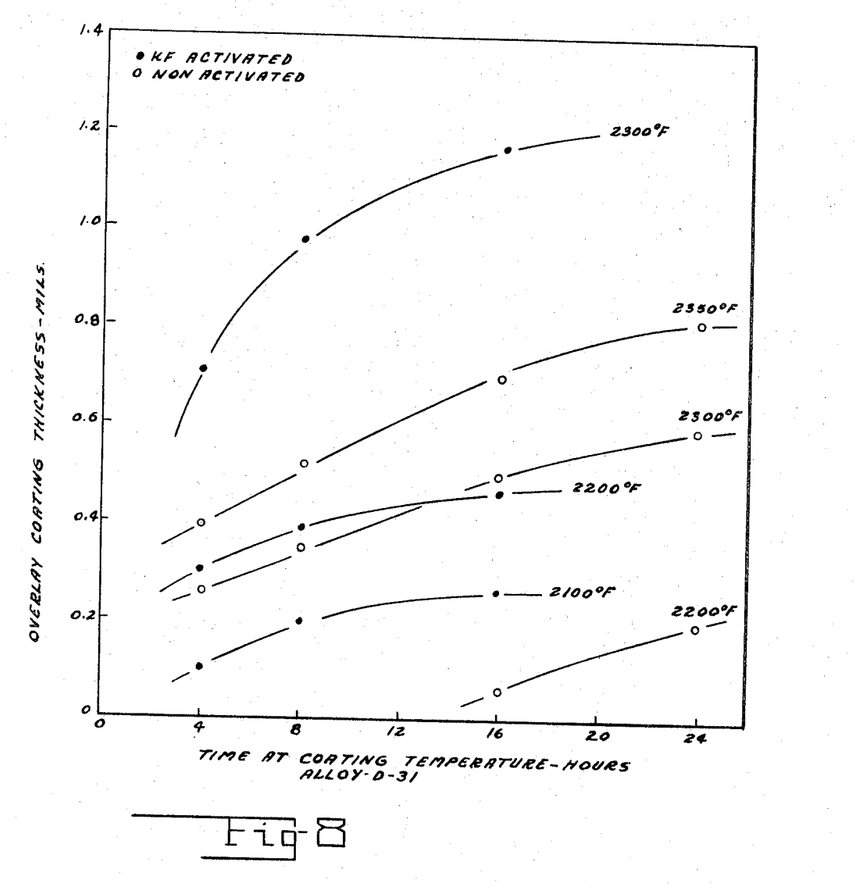
FIG. 8 is a series of progressively graduated temperature curves comparing the coating overlay thicknesses on the alloy D–31 along the ordinate as a function of coating time along the abscissa, by the cementation particles of chromium-titanium as compared with cementation particles of chromium-titanium-potassium fluoride, using the apparatus of FIG. 1.

FIG. 8 is a family of curves of the times the D-31 alloy substrates 3 are held at their coating temperatures in the can 1 in FIG. 1, as the coating thicknesses build up under both potassium fluoride activated and non-activated conditions, and where the cementation pack contains by weight 50 percent chromium and 50 percent titanium.

In FIGS. 8 to 12, of the drawings, the thickness of the coatings increases in a direct linear relation with increases in the time of deposition such, illustratively, as from 4 to 48 hours and with temperature increases over the range of from 2,100° F. to 2,400° F. This applies for both the unalloyed columbium and for the D-31 alloy, using the optimum pack particle size of −30 to +50 mesh for the 50-chromium-50-titanium particle alloy with increase in the rate of growth with increasing process temperatures.

The thickness of the coatings and the diffusion of chromium and titanium into the columbium base metal are important zones of protection against the oxidation of the substrate. The depth of the diffusion zone increases directly as a function of increases in time and temperatures of the deposition.

Figure 9:
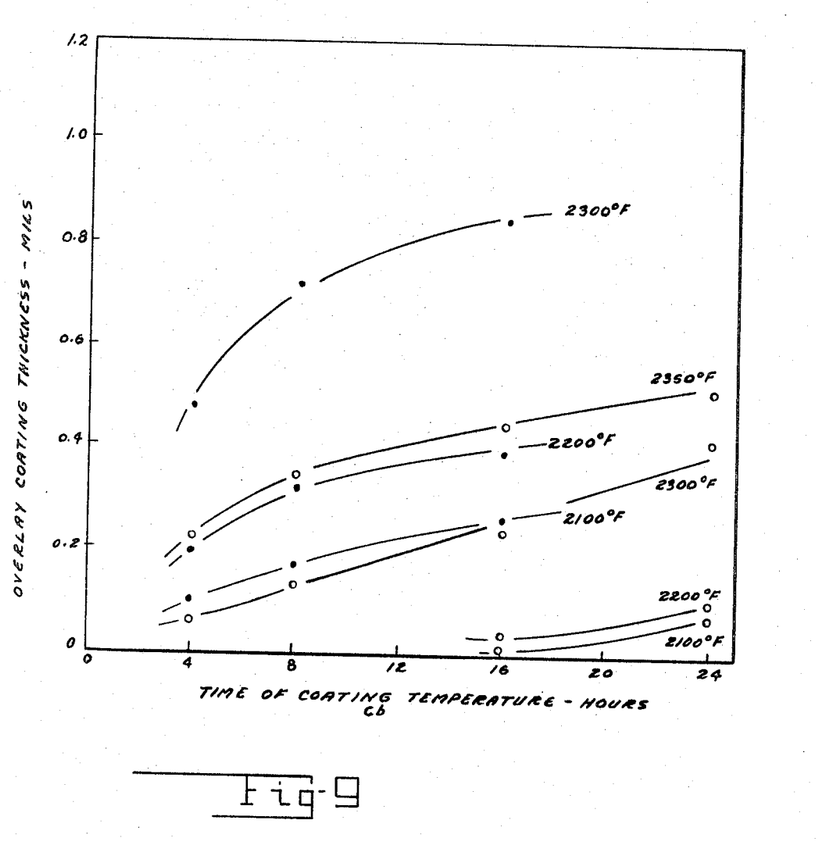
FIG. 9 is a series of curves corresponding to those in FIG. 8 of coating thicknesses on unalloyed columbium.

FIG. 9 is a family of curves that correspond with those in FIG. 8, but for unalloyed columbium it will be noted that the curves for columbium are displaced downwardly as compared with the curves for the D-31 alloy in FIG. 8.

It is noted that the thicknesses of the coatings that are deposited from activated packs are at least about double the thicknesses of the coatings that are deposited from the non-activated packs, for comparable time-temperature conditions. The effective activity of chromium and titanium in their vapor phases is increased through the formation of metallic compounds with higher vapor pressures than the pure metals at the coating temperatures. The linear behavior of the non-activated curves suggests that the supply of a metal from its vapor phase to the surface on which it is deposited, is a function of the partial pressure of the chromium and titanium and is the rate controlling mechanism.

Figure 10:
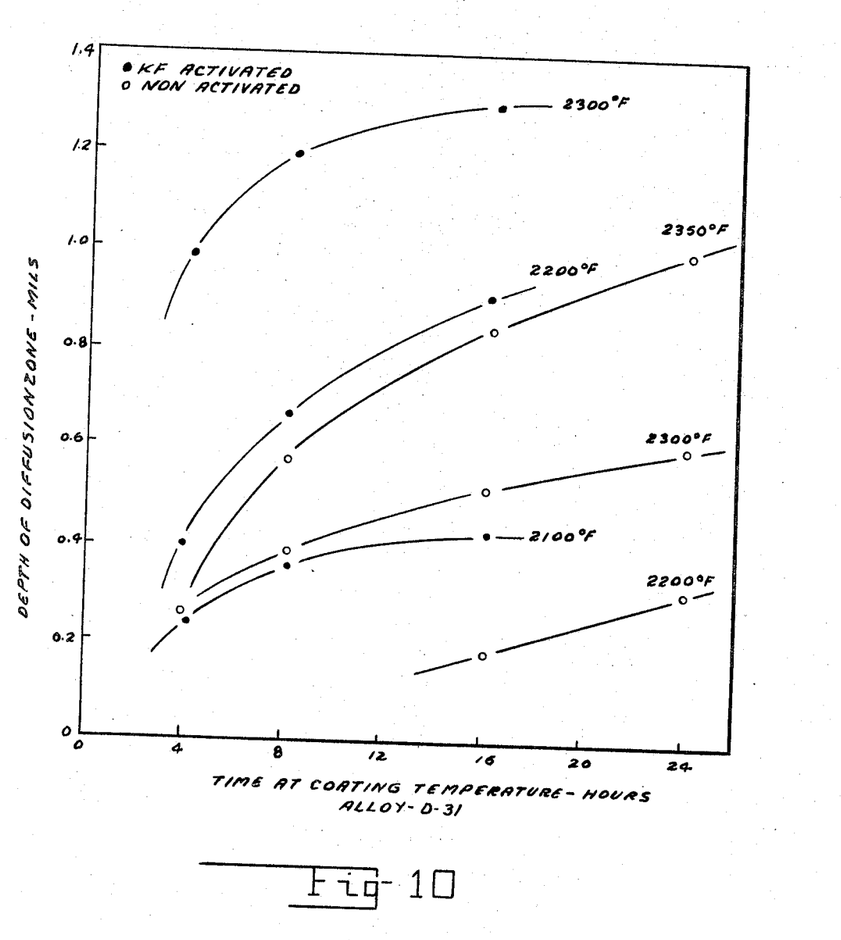
FIG. 10 is a series of curves comparing the depths of the diffusion zone as a function of coating time on the D–31 alloy for activated and non-activated cementation particles.
Figure 11:
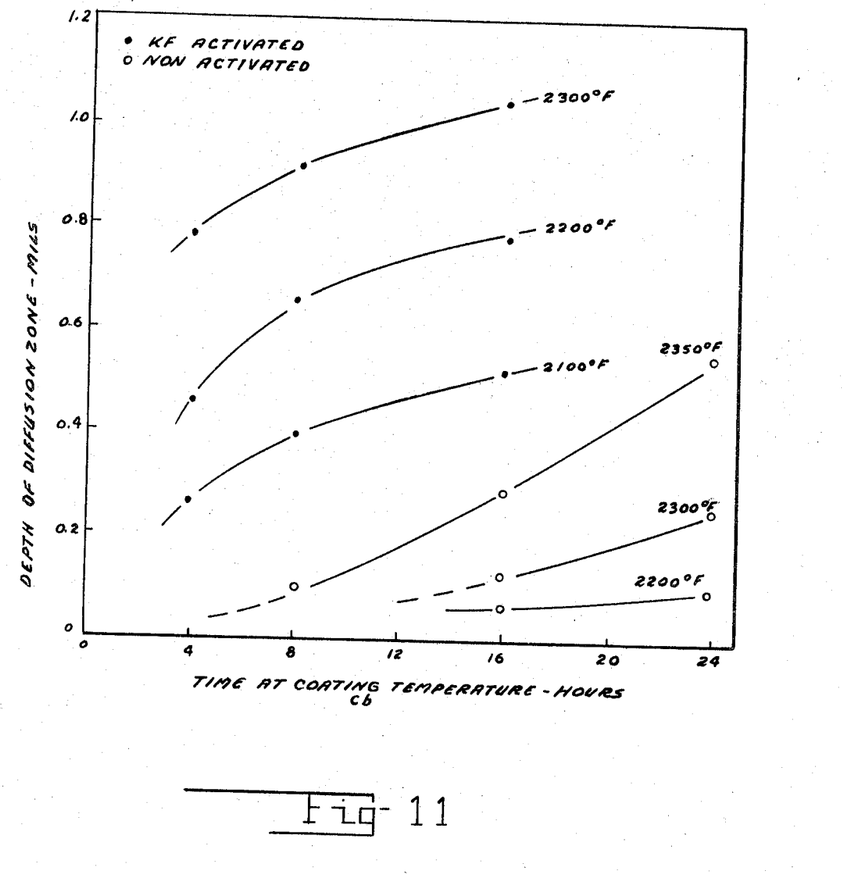
FIG. 11 is a series of curves comparing the depths of the diffusion zone as a function of coating time on unalloyed columbium for both activated and non-activated cementation particles, using the equipment in FIG. 1.

In FIGS. 10 and 11 of the accompanying drawings are shown the diffusion zone depths plotted against the time at the coating temperatures for, respectively, the D-31 alloy in FIG. 10 and for the unalloyed columbium in FIG. 11. In both the FIGS. 10 and 11 the large increase in the depths of the diffusion zones for the activated charge in the can 1 would not be expected. However, if the titanium activator compound were to have a disportionally higher vapor pressure than the corresponding chromium compound as would be expected in this case, the vapor phase would undergo a composition change to a higher percentage of titanium as well as an increase in the concentration of both chromium and titanium due to the addition of the activator. Since the measured diffusion zone depth is due only to the diffusion of titanium, the interface solute activity for titanium must be higher in the activated condition to account for the observed greater depth of diffusion.

The thickness of the coating that is deposited from an activated pack is approximately two or three times greater than the coatings that are deposited from non-activated packs of comparable compositions, under comparable time and temperature conditions. The effective activity of the chromium and the titanium in their vapor phases, is increased through the formation of metallic compounds that have higher vapor pressures than have the corresponding pure metals, at comparable coating temperatures. The exponential character of the activated curves indicates what would appear to be a diffusion controlled process.

Depletion of the activator in the pack appears to produce decay in the rate of the overlay deposition. The more linear behavior of the non-activated curves suggests that the supply of metal from the vapor phase to the deposition surface is a function of the partial pressures of the chromium and of the titanium, and hence is a rate controlling mechanism.

Figure 12:
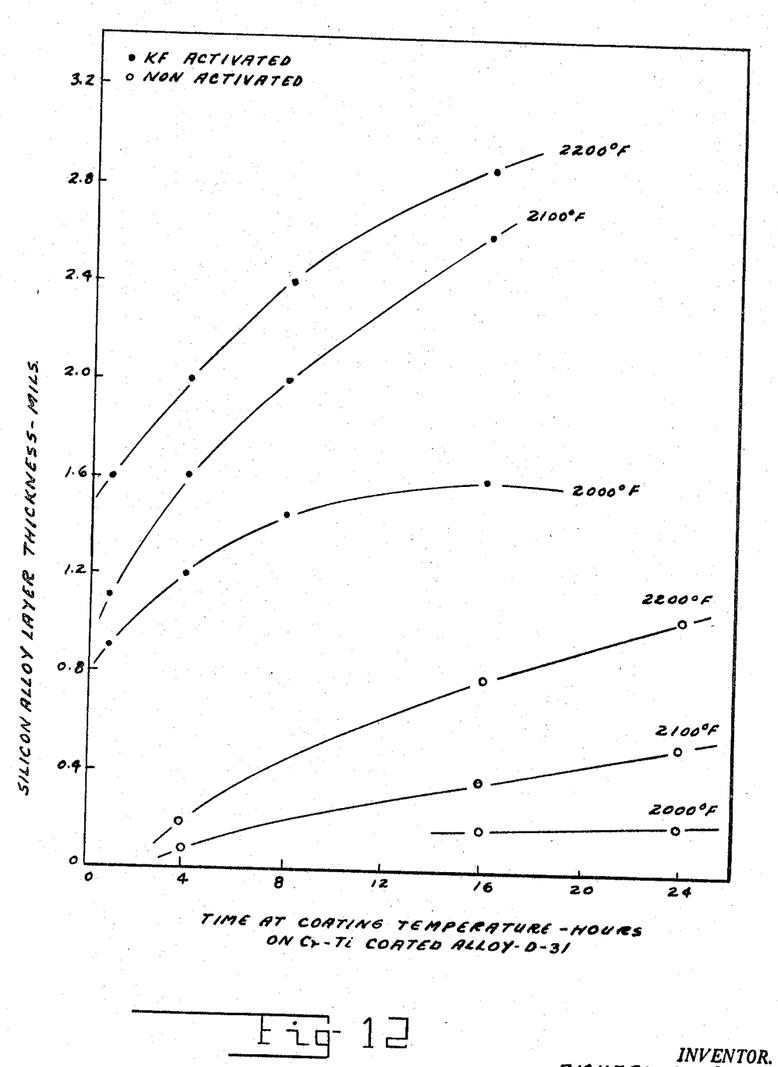
FIG. 12 is a family of curves for both activated and non-activated cementation particles, comparing the silicon alloy layer thicknesses along the ordinate wtih time along the abscissa, as applied to chromium-titanium coated D–31 alloy.

In FIG. 12 of the accompanying drawings is shown plotted values of the silicon alloy layer thickness as a function of coating time, comparing the deposition of silicon on Cr–Ti coated D–31 alloy under KF activated and non-activated conditions. Under the activated condition, all of the Cr–Ti coating layer is alloyed with silicon. The measured silicon alloy layer includes all of the Cr–Ti coating in the activated case, and only a portion of this layer for the non-activated coating. The addition of the activator to the silicon concentration pack in the apparatus shown in FIG. 1, increases the deposition rate by a factor of from three to five times that for the non-activated pack.

The oxidation protection at temperatures of 2,500° F. by the vacuum vapor deposition process that is disclosed herein is accomplished by positioning the piece to be coated within the cementation pack within the can 1 in FIG. 1 and exposing it at temperatures in the range of from 2,000° F. to 2,400° F. in an atmosphere of metallic vapor generated within the pack by the vapor pressure of the elements present.

The resulting vapor-solid interface reaction results in the formation of a diffusion alloy coating of elements of the vapor phase and from the base alloy. The vapor deposited coating consists of about 1 to 1.5 mils of diffusion alloy overlayed by about 2 to 3 mils of the coating alloy, depending on the time and the temperature of the process. Highly protective coatings consist of chromium-titanium, chromium-titanium-silicon, or chromium-titanium alloys that are formed by reactions with the columbium surface at temperatures of 2,350° F. for periods of from 16 to 24 hours. The coatings are metallic in appearance, dense, smooth and are not porous. The coatings are thin and dimensional changes are reproducible. Chromium-titanium-silicon coatings are from 2 to 3 mils thick, and are oxidation resistant alloys that protect their substrate base metals in the order of from 200 hours at 2,000° F., 100 hours at 2,250° F., and 10 hours at 2,500° F. when applied to the alloys D–31 or D–41, as disclosed herein. These values prolong the lives of coated shapes whether the shapes are of plain or complex configurations.

It is to be understood that the examples of articles of manufacture and the process and method by which the articles are made, that are described herein, are illustrative of the reduction to practice of the present invention and that limited modifications may be made therein without departing from the spirit and scope of the present invention.

I claim:

1. The process to be accomplished within an initially evacuated furnace of controlled partial pressures and temperatures for diffusing a protective coating into the surface of a refractory base metal article, wherein the base metal is selected from the group consisting of columbium and columbium-based alloys comprising the steps of mixing together in powdered solid state about from 30 to 69 parts chromium with 69 to 30 parts titanium and with one part potassium fluoride as a pack for surface diffusing partial pressure vaporized components into the article; embedding the article into the powered solid state pack; positioning the pack embedded article inside of the furnace; evacuating both the interior of the furnace and the pack and the pack embedded article in establishing a closed system for developing partial pressures of the contents of the furnace by temperature increase; elevating the temperature of the furnace in developing the partial pressures of the chromium, titanium and potassium fluoride of which the pack is composed and maintaining the temperature permitting the pack composition partial pressures to diffuse into the surface of the refractory base metal article immersed in the pack for a time adequate for the diffusion of at least the chromium and titanium to a desired depth into the immersed object; and lowering the furnace temperature.

2. The process defined by claim 1 wherein the coating pack consists of about equal parts of chromium and titanium particles applied to columbium for about 16 hours at a temperature of about 2350° F. as a columbium-chromium-titanium diffusion zone between the columbium base metal and the chromium-titanium overlay.

3. A process to be accomplished within an initially evacuated furnace of controlled partial pressures and temperatures for diffusing a protective coating into the surface of a refractory base metal article wherein the base metal is selected from the group consisting of columbium and columbium-based alloys comprising the steps of mixing together in powdered solid state about equal quantities by weight of chromium, titanium and silicon particles and with one part of potassium fluoride as a pack for surface diffusing partial pressure vapors into the article; embedding the article into the powdered solid state pack; positioning the article embedded in the pack inside of the furnace; evacuating both the interior of the furnace and the pack embedded article in establishing a closed system for developing partial pressures of the contents of the furnace by temperature increase; elevating the temperature of the furnace in developing the partial pressures of the chromium, titanium, silicon and potassium fluoride of which the pack is composed and maintaining the elevated temperature permitting the pack composition partial pressures to diffuse into the surface of the refractory base metal article immersed in the pack for a time adequate for the diffusion of at least the chromium, titanium and silicon to a desired depth into the immersed object; and lowering the furnace temperature.

4. The process defined in claim 3 wherein the furnace is maintained at about a temperature of 2150° F. for about 16 hours in making a product consisting of a columbium base metal article that is sequentially outwardly impregnated against oxidation at elevated temperatures by a columbium-chromium-titanium diffusion zone, a layer of chromium-titanium, a layer of silicon-chromium-titanium, and a surface layer of silicon.

5. The process to be accomplished within an initially evacuated furnace of controlled partial pressures and temperatures for diffusing a protective coating into the surface of a refractory base metal wherein the base metal is selected from the group consisting of columbium and columbium based alloys comprising the steps of embedding the article in powdered solid state pack comprising 30 to 70 percent chromium by weight, about one percent potassium fluoride by weight as an activator, and the balance titanium by weight; positioning the pack embedded article inside of the furnace; evacuating both the interior of the furnace and the pack and the pack embedded article in establishing a closed system for developing partial pressures of the contents of the furnace by temperature increase; elevating the temperature of the furnace in developing the partial pressures of the chromium, titanium and potassium fluoride of which the pack is composed and maintaining the temperature permitting the pack composition partial pressures to diffuse into the surface of the refractory base metal article immersed in the pack for a time adequate for the diffusion of at least the chromium and titanium to a desired depth into the immersed object; and lowering the furnace temperature.

6. The process of claim 5 wherein the temperature of the furnace is elevated to about 2350° F. for about 16 to 24 hours.

References Cited by the Examiner
UNITED STATES PATENTS

| | | | |
|---|---|---|---|
| 2,855,328 | 10/1958 | Long | 117—107.2 |
| 2,855,332 | 10/1958 | Samuel | 117—107.2 |
| 2,875,090 | 2/1959 | Galmiche | 117—107.2 X |
| 3,108,013 | 10/1963 | Pao Jen Chao et al. | 117—107.2 |
| 3,117,846 | 1/1964 | Pao Jen Chao | 17—107.2 X |
| 3,163,553 | 12/1964 | Commandy et al. | 117—66 X |

ALFRED L. LEAVITT, *Primary Examiner.*

RICHARD D. NEVIUS, *Examiner.*

S. GOLIAN, *Assistant Examiner.*